(12) United States Patent
Beligere et al.

(10) Patent No.: US 9,285,283 B2
(45) Date of Patent: Mar. 15, 2016

(54) ADAPTIVE WIRELESS TORQUE MEASUREMENT SYSTEM AND METHOD

(71) Applicant: HONEYWELL INTERNATIONAL INC., Morristown, NJ (US)

(72) Inventors: Sudheer Beligere, Karnataka (IN); Vijay Tippanna Talikoti, Karnataka (IN); Vishal Malhan, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 62 days.

(21) Appl. No.: 14/281,121

(22) Filed: May 19, 2014

(65) Prior Publication Data
US 2015/0330851 A1 Nov. 19, 2015

(51) Int. Cl.
| | |
|---|---|
| *G01L 3/10* | (2006.01) |
| *H02J 5/00* | (2006.01) |
| *H04B 5/00* | (2006.01) |
| *G01L 1/22* | (2006.01) |
| *G06F 17/00* | (2006.01) |
| *G01L 3/14* | (2006.01) |
| *G01L 3/12* | (2006.01) |
| *H02J 17/00* | (2006.01) |

(52) U.S. Cl.
CPC .................. *G01L 3/108* (2013.01); *H02J 5/005* (2013.01); *H04B 5/0031* (2013.01); *G01L 1/22* (2013.01); *G01L 3/10* (2013.01); *G01L 3/12* (2013.01); *G01L 3/1428* (2013.01); *G06F 17/00* (2013.01); *H02J 17/00* (2013.01); *Y10T 29/4902* (2015.01)

(58) Field of Classification Search
CPC ............. G01L 3/10; G01L 3/108; G01L 3/12; G01L 3/1428; G01L 1/22; G06F 17/00; H02J 17/00

USPC .......................... 700/295, 286, 291, 297, 298; 73/862.325, 862.331–862.335; 702/61, 702/60, 41
See application file for complete search history.

(56) References Cited

U.S. PATENT DOCUMENTS

| | | | |
|---|---|---|---|
| 3,758,845 A | 9/1973 | MacKelvie et al. | |
| 3,797,305 A | 3/1974 | Haskell | |
| 5,521,444 A | 5/1996 | Foreman | |
| 5,770,936 A | 6/1998 | Hirai et al. | |
| 5,814,900 A | 9/1998 | Esser et al. | |
| 5,945,744 A | 8/1999 | Dobler et al. | |
| 6,032,546 A | 3/2000 | Stone | |
| 6,040,986 A | 3/2000 | Sakamoto et al. | |
| 6,727,816 B1 * | 4/2004 | Helgeson ............. | H04W 52/08 347/10.1 |

(Continued)

*Primary Examiner* — Lisa Caputo
*Assistant Examiner* — Jonathan Dunlap
(74) *Attorney, Agent, or Firm* — Conley Rose, P.C.; Kristin Jordan Harkins

(57) ABSTRACT

An adaptive wireless torque measurement system includes a rotor, a rotor antenna, a stator antenna, stator electronics, and rotor electronics. The rotor antenna is attached to the rotor. The stator antenna is configured to be inductively coupled to the rotor antenna. The stator electronics are coupled to receive, via the stator antenna, feedback data and are configured, in response thereto, to generate and transmit, via the stator antenna, power signals at a power level magnitude based in part on the feedback data. The rotor electronics are attached to the rotor and are coupled to receive, via the rotor antenna, the power signals transmitted by the stator electronics. The rotor electronics are configured to determine the power level magnitude of the power signals, generate the feedback data, the feedback data at least including information representative of the determined power level magnitude, and transmit, via the rotor antenna, the feedback data.

18 Claims, 4 Drawing Sheets

(56) References Cited

U.S. PATENT DOCUMENTS

| | | |
|---|---|---|
| 6,772,011 B2 | 8/2004 | Dolgin |
| 7,233,137 B2 | 6/2007 | Nakamura et al. |
| 7,605,681 B2 | 10/2009 | Wobben |
| 8,013,706 B2 | 9/2011 | Simon et al. |
| 8,054,651 B2 | 11/2011 | Pollard |
| 8,234,937 B2 | 8/2012 | Ramalingam |
| 8,482,158 B2 | 7/2013 | Kurs et al. |
| 8,538,330 B2 | 9/2013 | Baarman |
| 8,542,085 B2 | 9/2013 | Stancu et al. |
| 2007/0276538 A1 | 11/2007 | Kjellsson et al. |
| 2009/0115627 A1* | 5/2009 | Duffy .................... G01D 18/00 340/870.3 |
| 2012/0315842 A1 | 12/2012 | Malhan et al. |
| 2013/0003820 A1 | 1/2013 | Malhan et al. |
| 2013/0211740 A1 | 8/2013 | Ramamurthy et al. |
| 2014/0000386 A1 | 1/2014 | Malhan et al. |
| 2014/0109643 A1* | 4/2014 | Natarajan ............. G01L 25/003 73/1.09 |

\* cited by examiner

ADAPTIVE WIRELESS TORQUE MEASUREMENT SYSTEM AND METHOD

TECHNICAL FIELD

The disclosure relates to torque measurement systems, and, more particularly, to torque measurement systems including wireless telemetry systems.

BACKGROUND

A torque sensing system may measure and record torque applied to a component of a rotating system. Example rotating systems may include combustion engines, electric motors, drive shafts, and many other systems that have one or more rotating elements. A variety of different types of torque sensing systems may be used for measuring torque in rotating systems. In general, a torque sensing system may include sensors attached to the rotating portion of the system and may include stationary electronics that are located off of the rotating portion. In some examples, a slip ring and brush system may make a communication connection between rotating sensors and stationary electronics. In other examples, communication between the rotating sensors and stationary electronics is wireless.

The above-mentioned wireless torque measurement systems can have tight alignment requirements between the rotor and stator for sufficient power transfer from the stator to the rotor, and for proper data transfer from the rotor to the stator. For example, in some instances the gap between the rotor and stator antenna may be about 2-3 mm and allows a maximum of ±2-3 mm misalignment. Considering that these systems can be mounted on shafts rotating at high speeds, such alignment requirement poses a tough challenge to equipment developers and assemblers.

Furthermore, in most wireless torque measurement systems, the power requirements of some of the associated electronics is fixed, and will not properly operate if there is a slight change in the gap between the rotor and stator antennas. Moreover, anticipating relatively high losses and interference, the power output of some of the associated electronics is fixed at a relatively high value. If it is desirable to operate the system at a relatively small gap, significant power loss and very low operational efficiency is experienced.

Hence, there is a need for a system and method to control the output power of wireless torque measurement systems and to operate the systems at optimal power levels and increase the overall efficiency thereof. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an adaptive wireless torque measurement system includes a rotor, a rotor antenna, a stator antenna, stator electronics, and rotor electronics. The rotor antenna is attached to the rotor. The stator antenna is configured to be inductively coupled to the rotor antenna. The stator electronics are coupled to receive, via the stator antenna, feedback data and are configured, in response thereto, to generate and transmit, via the stator antenna, power signals at a power level magnitude based in part on the feedback data. The rotor electronics are attached to the rotor and are coupled to receive, via the rotor antenna, the power signals transmitted by the stator electronics. The rotor electronics are configured to determine the power level magnitude of the power signals, generate the feedback data, the feedback data at least including information representative of the determined power level magnitude, and transmit, via the rotor antenna, the feedback data.

In another embodiment, a method for installing a wireless torque measurement system includes coupling a rotor antenna to a rotor, and disposing a stator antenna in proximity to the rotor antenna to thereby inductively couple to the stator antenna and the rotor antenna. Power signals transmitted by the stator electronics are received, via the rotor antenna, and rotor electronics are used to determine the power level magnitude of the power signals. The feedback data are generated with a bit resolution that is based at least in part on the determined power level magnitude, and transmitted, via the rotor antenna. The proximity of the stator and rotor antenna are adjusted to achieve a desired bit resolution in the feedback data.

In yet another embodiment, an adaptive wireless torque measurement system includes a rotor, a flat coil rotor antenna, a flat coil stator antenna, stator electronics, and rotor electronics. The flat coil rotor antenna is attached to the rotor. The flat coil stator antenna is configured to be inductively coupled to the rotor antenna. The stator electronics are coupled to receive, via the stator antenna, feedback data and are configured, in response thereto, to generate and transmit, via the stator antenna, power signals at a power level magnitude based in part on the feedback data. The rotor electronics are attached to the rotor and are coupled to receive, via the rotor antenna, the power signals transmitted by the stator electronics. The rotor electronics are configured to determine the power level magnitude of the power signals, generate the feedback data with a bit resolution that is base at least in part on the determined power level magnitude, the feedback data at least including information representative of the determined power level magnitude, and transmit, via the rotor antenna, the feedback data.

Furthermore, other desirable features and characteristics of the adaptive wireless torque measurement system will become apparent from the subsequent detailed description and the appended claim, taken in conjunction with the accompanying drawings and the preceding background.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A torque measurement system of the present disclosure may determine an amount of torque being applied to a static or moving object in real-time. For example, the torque measurement system of the present disclosure may determine an amount of torque being applied to a rotor as the rotor is rotating. The torque measurement system may include a strain detection device (e.g., one or more strain gauges) mounted (i.e., attached) to the rotor and configured to measure an amount of strain in the rotor. The rotor of the torque measurement system may also include rotor electronics and a rotor antenna. The rotor electronics may transmit data derived from the strain measurements off of the rotating rotor via the rotor antenna. The torque measurement system may include a single ear stator antenna arranged adjacent to the rotor that supplies power to, and receives the data transmitted from, the rotor antenna.

Figure 1:
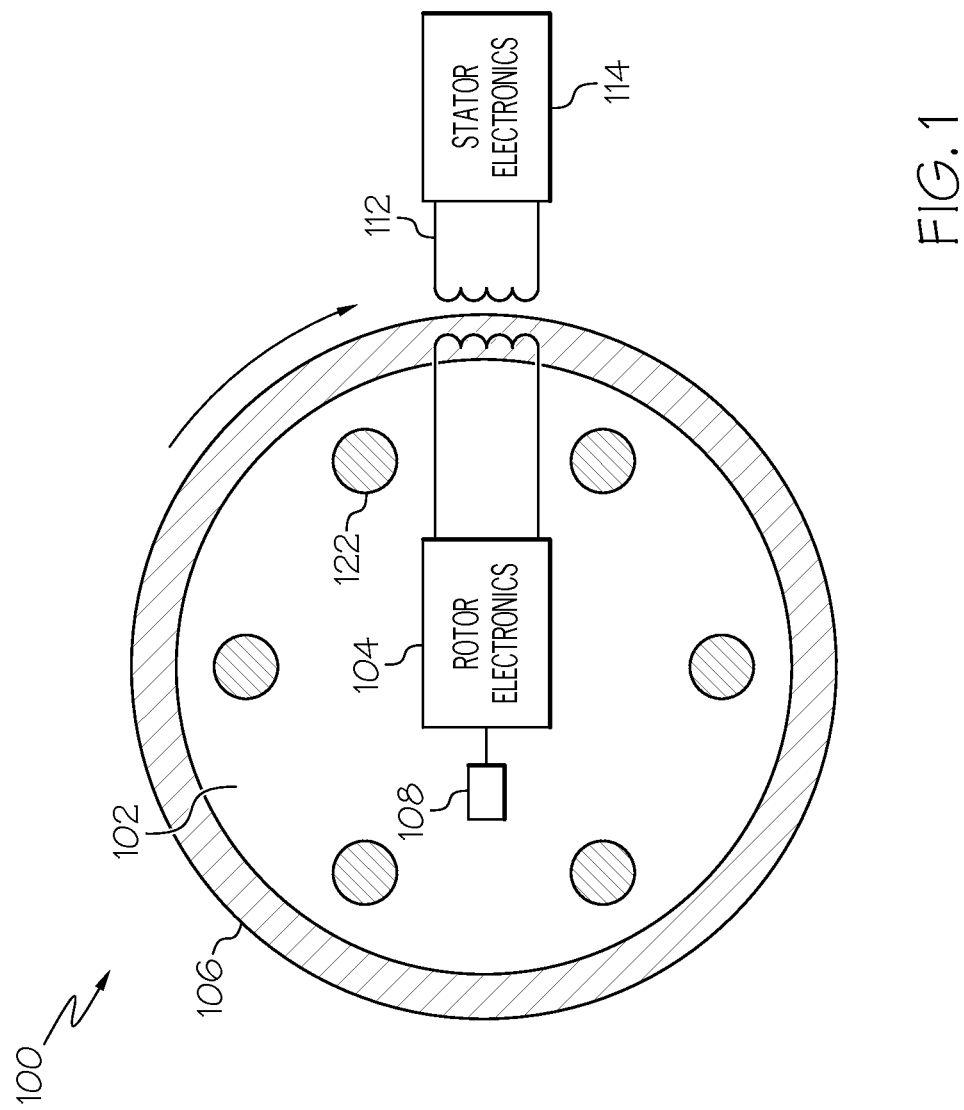
FIGS. 1-2 are block diagrams that show an example adaptive torque measurement system for determining an amount of torque being experienced by a rotor.
Figure 2:
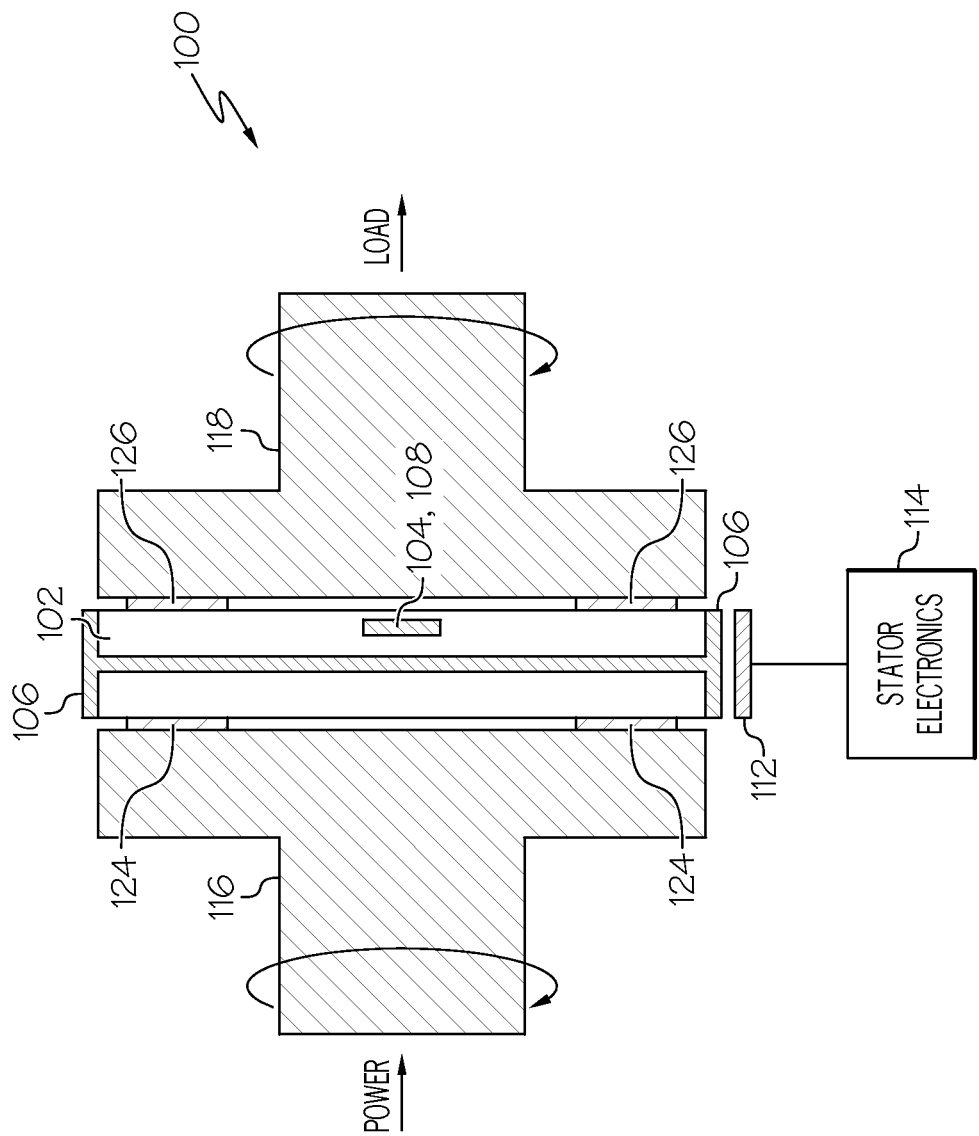

Referring first to FIGS. 1 and 2, block diagrams of an example adaptive torque measurement system 100 that determines an amount of torque being experienced by a rotor 102 are depicted. The torque measurement system 100 includes rotating components and stationary components. The rotating components include the rotor 102, rotor electronics 104, a rotor antenna 106, and a strain detection device 108. The stationary components include a stator antenna 112, and stator electronics 114.

The adaptive torque measurement system 100 may be included in a variety of different testing systems in order to measure torque values associated with those testing systems. In some examples, torque measurement system 100 may be used in an automotive powertrain testing system that is configured to test torque values associated with an engine, transmission, driveshaft, wheels, etc. In other examples, torque measurement system 100 may be used in a pump testing system or an electric motor testing system that is configured to measure torque values associated with those systems. Although torque measurement system 100 may be included in the above described systems, it is contemplated that torque measurement system 100 may be used to determine torque in any general mechanical system.

The components of an example testing system may be illustrated herein by a driving shaft 116 and an output shaft 118. The driving shaft 116 is coupled to the rotor 102, and may be driven by a power source, such as a combustion engine or an electric motor. The driving shaft 116 is coupled to the output shaft 118 via the rotor 102 such that the driving shaft 116 applies a torque to the rotor 102, which in turn applies a torque to the output shaft 118. The output shaft 118 may attach to a load.

The rotor 102 may comprise a metal disk (e.g., a flange) having holes (e.g., 122) for attachment to the driving shaft 116 and the output shaft 118. The rotor 102 may be attached to the driving shaft 116 on one side and the output shaft 118 on the other side. For example, the rotor 102 may include a first face that is attached to the driving shaft 116 using fasteners 124. In some embodiments, the fasteners 124 may comprise bolts that are fit through matching holes defined in both the driving shaft 116 and the rotor 102. A second face of the rotor 102 may be attached to the output shaft 118 using fasteners 126. In some embodiments, the fasteners 126 may comprise bolts that are fit through matching holes defined in both the output shaft 118 and the rotor 102.

The rotor electronics 104 and the strain detection device 108 are coupled to the rotor 102. The rotor electronics 104, among other functions, is configured to provide power to the strain detection device 108. The strain detection device 108 is configured to generate signals representative of the amount of strain in the rotor 102. The strain detection device 108 may be variously implemented, but in one embodiment includes one or more strain gauges that are configured to generate the signals that indicate the amount of strain in the rotor 102. The signals generated by strain detection device 108 that indicate the amount of strain in rotor 102 may be referred to herein as "strain signals." The rotor electronics 104 receive the strain signals generated by the strain detection device 108 and, in response thereto, digitizes the strain signals. The rotor electronics 104 is additionally configured to transmit the digitized strain signals via the rotor antenna 106.

The rotor electronics 104 is additionally coupled to receive, via the rotor antenna 106, an RF power signal that is transmitted by the stator electronics 114. The rotor electronics 104 is additionally configured, upon receipt of the RF power signals, to determine the power level magnitude of the RF power signals and generate feedback data that includes information representative of the determined power level magnitude. The feedback data, which additionally includes the digitized strain data, are transmitted, via the rotor antenna 106, to the stator electronics 114.

In addition to the above, the rotor electronics 104 is preferably configured to generate the feedback data with a bit resolution that is based, at least in part, on the determined power level magnitude. The particular bit resolution may vary, but in one embodiment, the bit resolutions are 8, 12, and 16. For example, if the determined power level magnitude is below a predetermined threshold level, the bit resolution is 8 bits, if the determined power level magnitude is between the predetermined lower threshold level and a predetermined upper threshold level, the bit resolution is 12 bits, and if the determined power level magnitude is above the predetermined upper threshold level, the bit resolution is 16 bits.

The rotor antenna 106 and stator antenna 112 are arranged such that the rotor antenna 106 and stator antenna 112 are inductively coupled. In the depicted embodiment, the rotor antenna 106 and the stator antenna 112 are each implemented as flat coil antennas. This antenna configuration will eliminate inaccuracies and inefficiencies associated with side-to-side movement of the rotor antenna 106. In other embodiments, the stator antenna 112 may be implemented using one or two ears, as is generally known in the art.

The stator electronics 114 is configured to generate and supply the RF power signal to the stator antenna 112 for transmission to the rotor antenna 106. The stator electronics 114 is additionally coupled to receive, via the stator antenna 112, the feedback data transmitted from the rotor electronics 104. The stator electronics 114 is configured, in response to the feedback data, to generate and transmit, via the stator antenna 112, the RF power signal at a power level magnitude based in part on the feedback data. The manner in which this is implemented will now be described.

Figure 3:
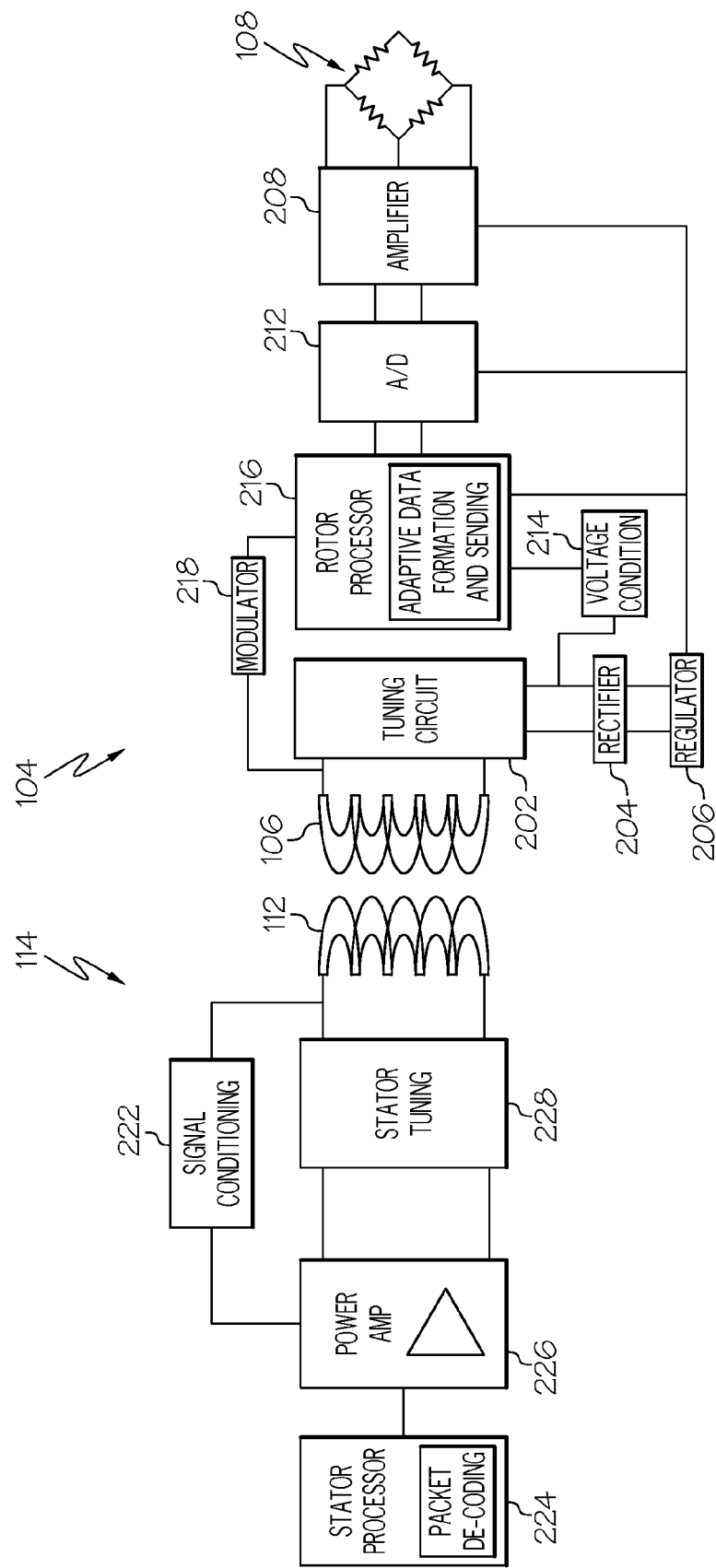
FIG. 3 depicts a functional block diagram of the torque measurement system of FIGS. 1 and 2, illustrating the rotor electronics and the stator electronics in more detail.

Referring now to FIG. 3, a functional block diagram of the torque measurement system 100, depicting the rotor electronics 104 and the stator electronics 114 in more detail, is illustrated and will be described in more detail.

The rotor electronics 104 includes a rotor antenna tuning circuit 202, a rectifier 204, a voltage regulator 206, an amplifier 208, an analog-to-digital (A/D) converter 212, a voltage conditioner 214, a rotor processor 216, and a modulator 218. The rotor antenna tuning circuit 202 includes one or more passive components coupled in parallel with the rotor electronics 104 to appropriately tune the rotor antenna 106 to receive the RF power signal from the stator electronics 114.

The rectifier 204 is coupled to the rotor antenna tuning circuit 202 and is configured to rectify and filter the RF power signal. The rectified and filtered RF power signal is supplied to the voltage regulator 206, which is configured to supply regulated DC power to the amplifier 208, the A/D converter 212, and the rotor processor 216, to power these components.

The amplifier 208 is coupled to receive the strain signals generated by the strain detection device 108 and is configured to amplify these signals. The amplified strain signals are supplied to the A/D converter 212, which is configured to generate the digitized strain data. The A/D converter 212 additionally supplies the strain data to the rotor processor 216.

The rotor processor 216 receives the strain data from the A/D converter 212 and a conditioned voltage signal from the voltage conditioner 214. The voltage conditioner 214, similar to the rectifier 204, is coupled to the tuning circuit 202 and thus receives the RF power signal therefrom. The voltage conditioner 214 conditions the RF power signal and supplies the conditioned RF power signal to the rotor processor 216. The rotor processor 216 is configured, upon receipt of the conditioned voltage signal, to determine the power level magnitude of the RF power signal received by the rotor antenna 106, and generate data representative of the determined power level magnitude. To do so, the rotor processor 216 implements an adaptive power level determination algorithm known to those skilled in the art.

The rotor processor 216 is additionally configured to generate the feedback data. In the depicted embodiment, the feedback data includes the data representative of the determined power level appended to the strain data. The feedback data are then supplied to the modulator 218. To do so, the rotor processor 216 implements an adaptive data packet formation and sending algorithm that is also known to those skilled in the art.

The modulator 218 is coupled between the rotor processor 216 and the rotor antenna 106. The modulator 218 receives the feedback data from the rotor processor 216, modulates it using any one of numerous known modulation schemes, and transmits the modulated feedback data, via the rotor antenna 106, to the stator antenna 112 for subsequent processing by the stator electronics 114.

The stator electronics 114 include a signal conditioning circuit 222, a stator processor 224, a power amplifier 226, and a stator antenna tuning circuit 228. The signal conditioning circuit is coupled to the stator antenna 112 to receive the modulated feedback data transmitted via the rotor antenna 106. The signal conditioning circuit demodulates the signal and supplies the feedback data to the stator processor 224 for further processing.

The stator processor 224 receives the feedback data from the signal conditioning circuit 222 and is configured, in response thereto, to de-code the strain data from the data representative of the determined power level magnitude. To do so, the stator processor 224 implements a packet de-coding algorithm known to those skilled in the art. The stator processor 224 either processes the strain data to determine the amount of torque being experienced by the rotor 102, or supplies the strain data to non-illustrated circuitry for further processing. The stator processor 224 additionally determines the power level magnitude of the RF power signal received by the rotor antenna 106. Based on this determination, the stator processor 224 supplies amplifier control signals representative of a desired power level magnitude to the power amplifier 226. To do so, the stator processor 224 implements an adaptive algorithm known to those skilled in the art.

The power amplifier 226, which is preferably implemented as a controllable RF power amplifier, is coupled to receive the amplifier control signals from the stator processor 224. The power amplifier 226 is configured, in response to the amplifier control signals, to generate an RF power signal at the desired power level magnitude. The RF power signal is supplied to the stator antenna 112, via the stator antenna tuning circuit 228, for transmission to the rotor antenna 106.

The power level amplifier 226, and the amplifier control signals supplied thereto, may vary. In one particular embodiment, the power level signal supplied from the stator processor 224 to the power amplifier 226 is a DC supply voltage signal of 6, 12, or 18 VDC. So, for example, if the stator processor 224 determines that the power level magnitude of the RF power signal received by the rotor antenna 106 is sufficient, then it supplies the 6 VDC signal to the power amplifier 226. If the stator processor 224 determines that the power level magnitude of the RF power signal received by the rotor antenna 106 is moderately insufficient, then it supplies the 12 VDC signal to the power amplifier 226. If, however, the stator processor 224 determines that the power level magnitude of the RF power signal received by the rotor antenna 106 is significantly insufficient, then it supplies the 18 VDC signal to the power amplifier 226.

The stator antenna tuning circuit 228, similar to the rotor antenna tuning circuit 202, includes one or more passive components coupled in parallel with the stator antenna 112 to appropriately tune the stator antenna 112.

Figure 4:
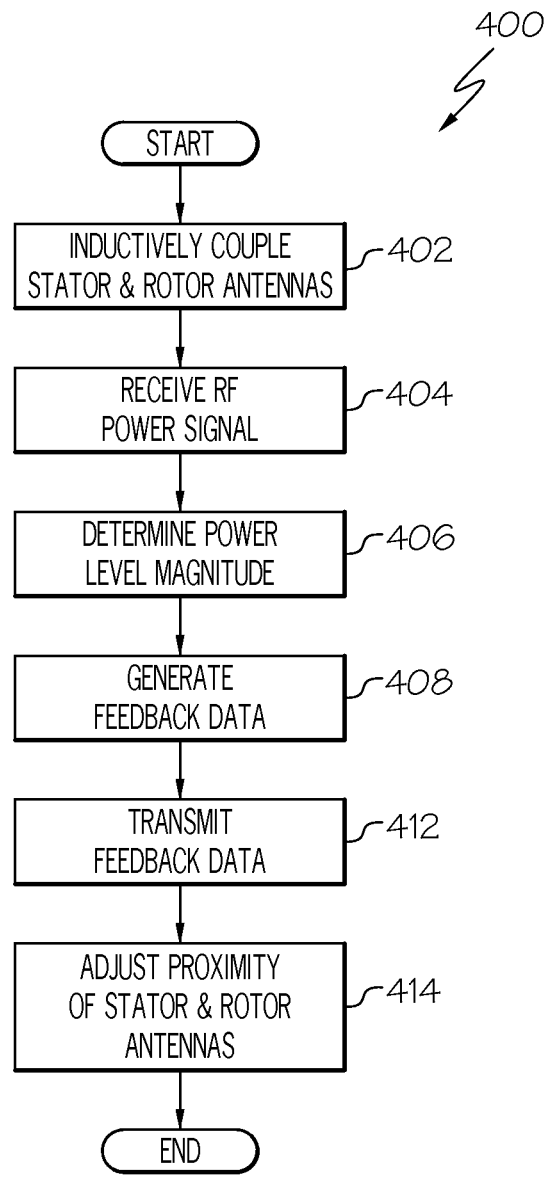
FIG. 4 depicts a method, in flowchart form, for installing the adaptive wireless torque measurement system of FIGS. 1-3.

The adaptive torque measurement system 100 described herein compensates for variations in clearance between the rotor and stator antennas 106, 112 that may occur during normal, post-installation operation. In addition, the system 100 also facilitates installation. In particular, it allows an end-user to dispose the rotor and stator antennas 106, 112 at various distances from each other, while allowing operability, albeit at different power levels and different bit resolutions. To better illustrate this principle, an example method for installing the adaptive wireless torque measurement system 100 is depicted, in flowchart form in FIG. 4, and with reference thereto will now be described.

The method 400 begins by disposing the stator antenna 112 in proximity to the rotor antenna 106 to thereby inductively couple to the stator antenna 112 and the rotor antenna 106 (402). Though not depicted in FIG. 4, the system 100 is preferably energized, either before or after disposing the stator antenna 112 in proximity to the rotor antenna 106. Thus, the RF power signal transmitted by the stator electronics 114 are received, via the rotor antenna 106, by the rotor electronics 104 (404).

The rotor electronics 104 are then used to determine the power level magnitude of the RF power signal (406), to generate the feedback data with a bit resolution that is based at least in part on the determined power level magnitude (408), and transmit, via the rotor antenna 106, the feedback data (412). Based on the feedback data received by the stator electronics 114, the proximity of the stator antenna 112 to the rotor antenna 106 may be selectively adjusted to achieve a desired proximity and, concomitantly, a desired bit resolution in the feedback data (414).

As a more detailed example, and using values described above and a particular embodiment, if the rotor and stator antennas 106, 112 are within an optimal distance of each other (e.g., 15 mm), then the power amplifier power level signal supplied to the RF power amplifier 226 will be approximately 6 VDC, and the feedback data will be supplied with 16 bit resolution. If the distance between the rotor and stator antennas 106, 112 is between about 15 mm and 20 mm, then the power amplifier power level signal supplied to the RF power amplifier 226 will be approximately 12 VDC, and the feedback data will be supplied with 12 bit resolution. If the distance between the rotor and stator antennas 106, 112 is between greater than 20 mm, then the power amplifier power level signal supplied to the RF power amplifier 226 will be approximately 18 VDC, and the feedback data will be supplied with 8 bit resolution.

The system and method described herein controls the output power of a wireless torque measurement system, allowing it to operate at optimal power levels and with increased overall efficiency.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claim.

What is claimed is:

1. An adaptive wireless torque measurement system comprising:
   a rotor;
   a rotor antenna attached to the rotor;
   a stator antenna configured to be inductively coupled to the rotor antenna;
   stator electronics coupled to receive, via the stator antenna, feedback data and configured, in response thereto, to generate and transmit, via the stator antenna, power signals at a power level magnitude based in part on the feedback data; and
   rotor electronics attached to the rotor and coupled to receive, via the rotor antenna, the power signals transmitted by the stator electronics, the rotor electronics configured to:
   (i) determine the power level magnitude of the power signals,
   (ii) generate the feedback data with a bit resolution based at least in part on the determined power level magnitude, the feedback data at least including information representative of the determined power level magnitude, and
   (iii) transmit, via the rotor antenna, the feedback data.

2. The system of claim 1, wherein the stator electronics comprise:
   a signal conditioning circuit coupled to the stator antenna to receive the feedback data transmitted via the rotor antenna;
   a stator processor coupled to receive the feedback data and configured, in response thereto, to determine the power level magnitude and supply amplifier control signals representative thereof;
   a power amplifier coupled to receive the amplifier control signals and configured, in response thereto, to generate the power signals at the power level magnitude.

3. The system of claim 2, wherein the stator processor is further configured, in response to the feedback data, to determine an amount of torque being experienced by the rotor.

4. The system of claim 1, wherein the rotor antenna and the stator antenna are each configured as flat coil antennas.

5. The system of claim 1, wherein the rotor electronics comprise:
   a strain detection device attached to the rotor and configured to generate signals that indicate an amount of strain in the rotor;
   an amplifier attached to the rotor and configured to amplify the signals generated by the strain detection device; and
   a rotor processor attached to the rotor and configured to transmit, via the rotor antenna, the feedback data,
   wherein the feedback data further includes information representative of the amount of strain in the rotor.

6. The system of claim 5, wherein the rotor is configured to connect to a driving shaft that rotates the rotor, and wherein the rotor antenna, the strain detection device, the amplifier, and the rotor processor are configured to rotate along with the rotor.

7. The system of claim 5, wherein the rotor is configured to couple a driving shaft to an output shaft, wherein the rotor is configured to transfer a torque applied by the driving shaft to the output shaft, and wherein the amount of strain in the rotor is induced when the torque is applied by the driving shaft.

8. The system of claim 5, wherein the strain detection device comprises one or more strain gauges that are configured to generate the signals that indicate the amount of strain in the rotor.

9. The system of claim 5, further comprising an analog-to-digital converter module attached to the rotor and configured to receive the amplified signals and digitize the amplified signals.

10. A method for installing a wireless torque measurement system, the method comprising the steps of:
    coupling a rotor antenna to a rotor;
    disposing a stator antenna in proximity to the rotor antenna to thereby inductively couple to the stator antenna and the rotor antenna;
    receiving, via the rotor antenna, power signals transmitted by stator electronics;
    using rotor electronics to (i) determine the power level magnitude of the power signals, (ii) generate feedback data with a bit resolution that is based at least in part on the determined power level magnitude, and (iii) transmit, via the rotor antenna, the feedback data; and
    adjusting the proximity of the stator and rotor antenna to achieve a desired bit resolution in the feedback data.

11. An adaptive wireless torque measurement system comprising:
    a rotor;
    a flat coil rotor antenna attached to the rotor;
    a flat coil stator antenna configured to be inductively coupled to the rotor antenna;
    stator electronics coupled to receive, via the stator antenna, feedback data and configured, in response thereto, to generate and transmit, via the stator antenna, power signals at a power level magnitude based in part on the feedback data; and
    rotor electronics attached to the rotor and coupled to receive, via the rotor antenna, the power signals transmitted by the stator electronics, the rotor electronics configured to:
    (i) determine the power level magnitude of the power signals,
    (ii) generate the feedback data with a bit resolution based at least in part on the determined power level magnitude, the feedback data at least including information representative of the determined power level magnitude, and
    (iii) transmit, via the rotor antenna, the feedback data.

12. The system of claim 11, wherein the stator electronics comprise:
    a signal conditioning circuit coupled to the stator antenna to receive the feedback data transmitted via the rotor antenna;
    a stator processor coupled to receive the feedback data and configured, in response thereto, to determine the power level magnitude and supply amplifier control signals representative thereof;
    a power amplifier coupled to receive the amplifier control signals and configured, in response thereto, to generate the power signals at the power level magnitude.

13. The system of claim 12, wherein the stator processor is further configured, in response to the feedback data, to determine an amount of torque being experienced by the rotor.

14. The system of claim 11, wherein the rotor electronics comprise:
    a strain detection device attached to the rotor and configured to generate signals that indicate an amount of strain in the rotor;
    an amplifier attached to the rotor and configured to amplify the signals generated by the strain detection device; and
    a rotor processor attached to the rotor and configured to transmit, via the rotor antenna, the feedback data,
    wherein the feedback data further includes information representative of the amount of strain in the rotor.

15. The system of claim 14, wherein the rotor is configured to connect to a driving shaft that rotates the rotor, and wherein the rotor antenna, the strain detection device, the amplifier, and the rotor processor are configured to rotate along with the rotor.

16. The system of claim 14, wherein the rotor is configured to couple a driving shaft to an output shaft, wherein the rotor is configured to transfer a torque applied by the driving shaft to the output shaft, and wherein the amount of strain in the rotor is induced when the torque is applied by the driving shaft.

17. The system of claim 14, wherein the strain detection device comprises one or more strain gauges that are configured to generate the signals that indicate the amount of strain in the rotor.

18. The system of claim 14, further comprising an analog-to-digital converter module attached to the rotor and configured to receive the amplified signals and digitize the amplified signals.

* * * * *